3,070,612
4-ALKYL COMPOUNDS OF THE ANDROSTANE SERIES AND ESTERS THEREOF

John C. Babcock, Portage Township, Kalamazoo County, and Raymond L. Pederson, Kalamazoo, Mich., assignors to The Upjohn Company, Kalamazoo, Mich., a corporation of Michigan
No Drawing. Filed June 2, 1958, Ser. No. 739,438
9 Claims. (Cl. 260—397.4)

The present invention relates to new steroids and is more particularly concerned with certain 4-alkyl-17β-hydroxy-4-androsten-3-ones, the 17-acylates thereof, 4-alkyl-17β-hydroxyandrostan-3-ones, the 17-acylates thereof, and methods used in the preparation thereof.

Novel compounds included in the present invention and the process for the production therefor can be represented by the following sequence of formulae:

inclusive, $n$ and $n'$ are whole numbers from one to two, inclusive, and "alkyl" is a lower-alkyl radical containing from one to four carbon atoms, inclusive, and in the compounds represented by Formulae V and VI, its configuration includes the $\alpha$ and $\beta$.

The novel compounds, as described above, e.g., 4-alkyl-17α-lower-aliphatic hydrocarbon - 17β-hydroxy-4-androsten-3-ones, the 17-acylates thereof, 4,17α-dialkyl-17β-hydroxyandrostan-3-ones, and the 17-acylates thereof are useful as anabolic and androgenic agents with improved therapeutic ratio, e.g., possessing a relatively high anabolic activity and a relatively low androgenic activity. The novel compounds are also useful as progestational, and central nervous system regulating agents. The compounds of the present invention, as described above, are particularly useful as anabolic agents.

Also included in the present invention are 4-alkyltestosterones and 17-acylates thereof and 4-alkyl-17β-hydroxy-

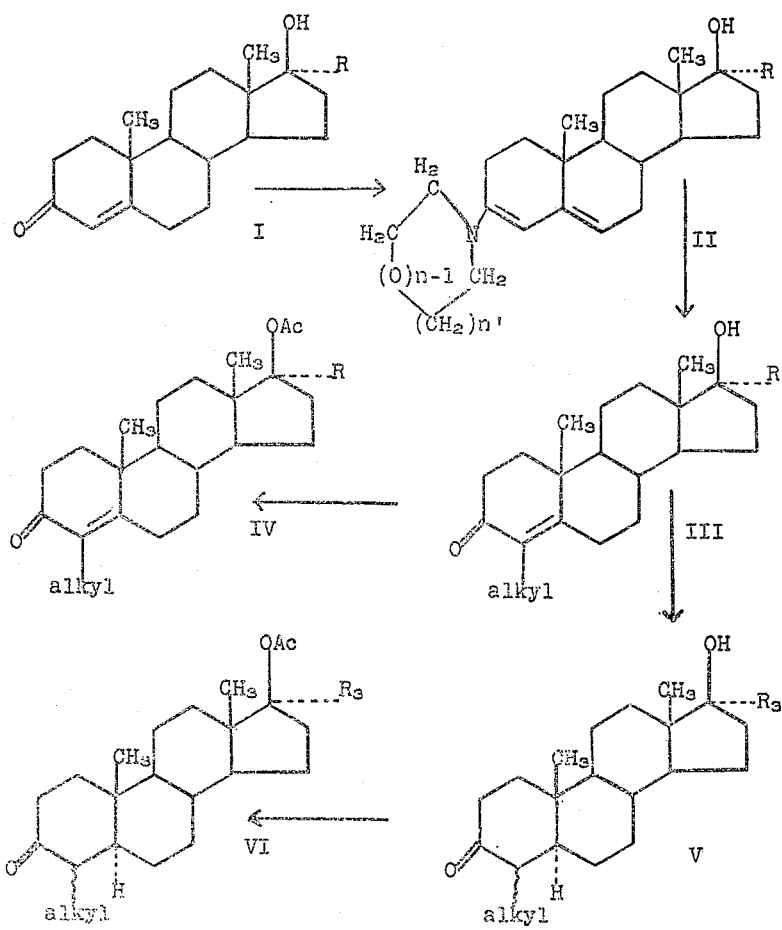

wherein R represents a lower-aliphatic hydrocarbon radical. The term lower-aliphatic hydrocarbon radical as used herein refers to an alkyl radical of from one to six carbon atoms, inclusive, such as for example, methyl, ethyl, propyl, isopropyl, tertiary butyl, hexyl and the like, or an alkenyl radical of from one to six carbon atoms, inclusive, such as for example, vinyl, allyl, α-methallyl, β-methallyl, and the like, or an alkinyl radical of the structure —C≡CR$_1$, wherein R$_1$ is hydrogen or an alkyl radical of from one to four carbon atoms, inclusive, e.g., methyl, ethyl, propyl, isopropyl, butyl, isobutyl, and tertiary butyl. R$_3$ is an alkyl radical containing from one to six carbon atoms, inclusive, Ac is an acyl radical of an organic carboxylic acid, preferably a hydrocarbon carboxylic acid, containing from one to twelve carbon atoms, androstan-3-ones and the 17-acylates thereof, wherein the acyl radical is as defined above. These compounds are likewise useful as anabolic agents and as progestational, and central nervous system regulating agents. For example, 4-methyltestosterone, a typical 4-alkyltestosterone, has an anabolic activity of 25 percent of methyltestosterone and yet is inactive as an androgen when administered orally. Subcutaneously 4-methyltestosterone possesses an anabolic activity of 21 percent of testosterone propionate and an androgenic activity of fourteen percent of testosterone propionate, thus affording a favorable subcutaneous ratio of 1.5:1. 4-methyltestosterone and its 17-acylates are particularly useful, owing to their favorable anabolic-androgenic ratio, where clinical efficacy requires low relative androgenic activity.

The compounds of the present invention that are substituted in the 17-position by a lower-aliphatic hydrocarbon substituent possess a greater anabolic activity compared with 4-methyltestosterone. Thus, 4,17α-dimethyl-17β-hydroxy-4-androsten-3-one was found to have an oral anabolic activity of 62 percent of methyltestosterone and an androgenic activity of only twenty percent of methyltestosterone, thus giving a favorable oral anabolic to androgenic ratio of 3.1:1. Subcutaneously, 4,17α-dimethyl-17β-hydroxy-4-androsten-3-one was found to have an anabolic activity of twenty percent of testosterone propionate and an androgenic activity of twelve percent of testosterone propionate, thus giving a favorable subcutaneous ratio of 1.67:1.

It can be readily seen that the anabolic-androgenic ratios of 4-methyltestosterone and 4,17α-dimethyl-17β-hydroxy-4-androsten-3-one are considerably greater than that for the parent, methyltestosterone or testosterone propionate. Thus, when androgenic side effects are a limiting factor, a greater anabolic response can be obtained from 4-methyltestosterone or 4,17α-dimethyl-17β-hydroxy-4-androsten-3-one than from methyltestosterone or testosterone propionate at equivalent androgenic doses. This is particularly significant in pediatric and geriatric practice where appreciable androgenic effects are clearly contraindicated.

The compounds of the present invention by virtue of their anabolic properties are useful in promoting retention of nitrogen (protein), increasing weight, restoring muscle strength, and increasing the sense of well-being in debilitated patients. Their ability to increase erythropoiesis, as well, make them particularly useful in anemic conditions. The compounds of this invention, because of their favorable anabolic-androgenic ratio and high potency at suitable low doses, can effect these responses while producing no, or only a minimal androgenic response. The ability of these compounds to cause gain in weight gives to them the additional utility of being valuable additives to animal and poultry feeds. Furthermore, as shown in the examples, the 4-alkyl-17β-hydroxy-4-androsten-3-ones (4-alkyltestosterones) and 4-alkyl-17α-lower-aliphatic hydrocarbon-17b-hydroxy-4-androsten-3-ones are intermediates in the production of the corresponding 4-alkyl-17β-hydroxyandrostan-3-one, the esters thereof, 4,17α-dialkyl-17β-hydroxyandrostan-3-one, and esters thereof. Treating 4-alkyl-17β-hydroxyandrostan-3-one, or 4,17α-dialkyl-17β-hydroxyandrostan-3-one with sodium borohydride provides the corresponding 4-alkyl-3β,17β-dihydroxyandrostanes and 4,17α-dialkyl-3β,17β-dihydroxyandrostanes which have anabolic, androgenic, and central nervous system-regulating actions of improved therapeutic ratio. These compounds also exhibit pituitary-inhibiting activity and can be used as injectables in solution or as oral preparations, either as such or in the form of esters of 4-alkyl-3β,17β-dihydroxyandrostanes and esters of 4,17α-dialkyl-3β,17β-dihydroxyandrostanes.

The novel compounds of the present invention have decided advantage over many of the selective anabolic-androgenic compounds known in the prior art in that they are active when administered orally.

The novel compounds of the present invention can be prepared and administered in a wide variety of oral and subcutaneous dosage forms singly, or in admixture with other coacting compounds. They can be associated with a pharmaceutical carrier which can be a solid material or a liquid in which the compound is dissolved, dispersed or suspended. The solid compositions can take the form of tablets, powers, capsules, pills, or the like, preferably in unit dosage forms for simple administration or precise dosages. The liquid compositions can take the form of solutions, emulsions, suspensions, syrups or elixirs. The products of this invention can also be added to animal feeds according to procedures well known in the art.

The process of the present invention comprises: treating 17β-hydroxy-4-androsten-3-one (testosterone) or a 17α-lower-aliphatic hydrocarbon-17β-hydroxy-4-androsten-3-one with a secondary cyclic amine to produce the 3-enamine of the corresponding starting material. The 3-enamine thus produced can then be reacted with an alkylating agent to produce the 4-alkyl-3-enamine of the corresponding starting material; these compounds on hydrolytic removal of the enamine yield the corresponding 4-alkyl-3-keto compounds, the 4-alkyl-17β-hydroxy-4-androsten-3-ones, and the 4-alkyl-17α-lower-aliphatic hydrocarbon-17β-hydroxy-4-androsten-3-ones, which can be esterified with an acylating agent such as an acid anhydride or acid halide of an organic carboxylic acid, especially a hydrocarbon carboxylic acid containing from one to twelve carbon atoms, inclusive, to yield the corresponding 17β-acylates, the 4-alkyl-17β-acyloxy-4-androsten-3-ones and the 4-alkyl-17α-lower-aliphatic hydrocarbon-17β - acyloxy - 4 - androsten-3-ones. The 4-alkyl-17β-hydroxy-4-androsten-3-ones and 4,17α-dialkyl-17β-hydroxy-4-androsten-3-ones produced above can be reacted with hydrogen in the presence of a palladium catalyst under neutral or acidic conditions to obtain the corresponding 4β-alkyl-17β-hydroxyandrostan-3-ones and 4β,17α-dialkyl-17β-hydroxyandrostan-3-ones. The 4β-epimers thus produced can be converted by epimerization with a mineral acid or a base to produce the corresponding 4α-epimers, 4α-alkyl-17α-hydroxyandrostan-3-ones and 4α,17α-dialkyl-17β-hydroxyandrostan-3-ones. The 4α- and 4β-alkylandrostanes thus produced can be esterified with acylating agents such as an acid halide or acid anhydride of an organic carboxylic acid, especially a hydrocarbon carboxylic acid containing from one to twelve carbon atoms, inclusive, to yield the corresponding 4β-alkyl-17β-acyloxyandrostan-3-ones, 4β,17α-dialkyl-17β-acyloxyandrostan-3-ones, 4α-alkyl-17β-acyloxyandrostan-3-ones, and 4α,17α-dialkyl-17β-acyloxyandrostan-3-ones.

Suitable starting materials, such as 17β-hydroxy-4-androsten-3-ones and 17α-lower-aliphatic hydrocarbon-17β-hydroxy-4-androsten-3-ones, for example, 17α-methyl-17β-hydroxy-4-androsten-3-one, 17α-ethyl-17β-hydroxy-4-androsten-3-one, 17α-vinyl-17β-hydroxy-4-androsten-3-one, and 17α - ethinyl - 17β - hydroxy-4-androsten-3-one, are known in the art. Other starting materials represented by Formula I can be prepared by treating 4-androstene-3,17-dione disclosed in U.S. Patent 2,774,122, with a secondary cyclic amine, in the same manner as outlined below in the process of the present invention for the preparation of the 3-enamines of testosterone and the 17α-lower-aliphatic hydrocarbon substituted androstenes, to produce the corresponding 3-enamine of 4-androstene-3, 17-dione. The 3-enamines thus produced can then be treated with a Grignard reagent, such as for example, 2-butenylmagnesium bromide (or chloride) to add the side chain at the 17α-position. The Grignard reagent is then decomposed, preferably with ammonium chloride.

Following decomposition of the Grignard reagent, the 3-enamine group is removed by hydrolysis. The hydrolysis of the 3-enamine group is preferably carried out using a buffered solution, such as a solution containing sodium acetate, water, glacial acetic acid, and methanol. Alternatively, the 3-enamine group is hydrolyzed using mildly alkaline conditions, such as a sodium acetate solution. The starting materials of Formula I, such as for example, 17α-(α-methallyl)-17β-hydroxy - 4 - androsten-3-one, are then recovered from the solution used to hydrolyze the 3-enamine group according to procedures well known in the art, such as by extraction with water-immiscible solvents, e.g., methylene chloride, ether, benzene, or the like followed by crystallization or chromatography.

Other Grignard reagents, such as for example, propyl, magnesium bromide (or chloride), isopropyl magnesium bromide (or chloride), butyl magnesium bromide (or chloride), allylmagnesium bromide (or chloride), or 2-pentenyl magnesium bromide (or chloride), 2-hexenyl magnesium bromide (or chloride), 2-isohexenyl magnesium bromide, and the like can be substituted for the 2- butenyl magnesium bromide disclosed above to prepare other compounds represented by Formula I, wherein the 17α-position is alkyl and alkenyl consisting of from one to six carbon atoms, inclusive. The process is explained in detail in Preparation I.

The alkinyl substituted starting materials represented by Formula I, such as for example, 17α-ethinyl-17β-hydroxy-4-androsten-3-one can be prepared from dehydroepiandrosterone according to the procedures disclosed by Ruzicka and Hofmann [Helv. 20, 1280 (1937)] and Inhoffen, Logemann, Hohlweg and Serini [Ber. 71, 1024 (1938)]. By substituting methyl acetylene for acetylene, the process is productive of 17α-methylethinyl-17β-hydroxy-4-androsten-3-one.

Illustrative of the starting materials for this invention are 17β-hydroxy-4-androsten-3-one, 17α-methyl-17β-hydroxy - 4 - androsten-3-one, 17α-ethyl-17β-hydroxy-4-androsten - 3-one, 17α-vinyl-17β-hydroxy-4-androsten-3-one, 17α - (α-methallyl)-17β-hydroxy-4-androsten-3-one, 17α-ethinyl - 17β - hydroxy - 4-androsten-3-one, 17α-methylethinyl-17β-hydroxy-4-androsten-3-one, and the like.

According to the process of the present invention, the ketone group at the 3-position of the starting material is converted to the corresponding 3-enamine derivative by reaction with a secondary cyclic amine. The enamine formation can be carried out in accordance with the disclosure of U.S. Patent 2,781,342.

Amines which can be used are pyrrolidine, morpholine, piperidine, homomorpholine, C-alkyl substituted pyrrolidines, e.g., 2,4-dimethylpyrrolidine, 3-isopropylpyrrolidine, 3,3-dimethylpyrrolidine and the like. Of these amines pyrrolidine is preferred. The selected amine is usually used in a molar excess, calculated on the starting steroid, to achieve the optimum yield of enamine product. Although large molar equivalent excesses of the amine can be employed in the reaction, the preferred proportion of amine to starting steroid is usually from about 1.1 to two. For best yields it is sometimes advantageous to conduct the enamine formation and alkylation step in an atmosphere of nitrogen.

Moisture in the reaction is somewhat detrimental to the procurement of high yields of product, and preferred reaction conditions therefore include removal of the water formed during the enamine formation by known methods. The reaction is preferably conducted above room temperature, i.e., above about 25 degrees centigrade, e.g., between about 25 and 150 degrees centigrade. Reaction times vary between about a few minutes to several days, depending in part upon the reaction solvent or solvents, ratio of reactants, selected amine, water removal and temperature. Reaction solvents employed are benzene, toluene, xylene, chlorobenzene, pentane, hexane, methylene chloride, carbon tetrachloride, methanol, ethanol, tertiary butyl alcohol, tetrahydrofuran, dioxane, and the like.

The 3-enamine of the corresponding starting material thus produced is then alkylated in a dry inert organic solvent such as ethanol, methanol, isopropanol, butanol, ethyl acetate, chlorinated hydrocarbons, and the like with an excess of alkylating agent such as an alkyl halide, to produce the 4-alkyl-3-enamine of the corresponding starting material. Alkyl halides thus employed are those wherein the alkyl group has from one to four carbon atoms, inclusive, and the halogen is chlorine, bromine, or iodine, with bromine and iodine generally preferred. Representative alkyl halides include methyl, ethyl, propyl, isopropyl, butyl, isobutyl, tertiary butyl bromide and iodide and allyl bromide. The corresponding alkyl chlorides are also operative, but usualy give inferior yields.

A preferred method is to treat the 3-enamine of the corresponding starting material with an excess of alkyl iodide in methanol and reflux for about two and one-half hours. The corresponding 3-enamine of 4-alkyl-17β-hydroxy-4-androsten-3-one or the 3-enamine of 4-alkyl-17α-lower - aliphatic hydrocarbon-17β-hydroxy-4-androsten-3-one thus produced can then be hydrolyzed with water, aqueous acid or base, alkanols or alkanol-water mixtures. This treatment removes the 3-enamine group and results in regeneration of the Δ⁴-3-keto group in the steroid nucleus, with production of the corresponding 4-alkyl-17β - hydroxy - 4 - androsten-3-one or 4-alkyl-17α-loweraliphatic hydrocarbon-17β-hydroxy-4-androsten-3-one.

A preferred method for the hydrolysis of the 3-enamine group is to add water directly to the 3-enamine-alkyl halide reaction mixture after the alkylation is complete and to allow the aqueous mixture to stand overnight at about 25 degrees centigrade. The aqueous mixture is then heated under reflux for one hour and then concentrated by distillation at atmospheric pressure to remove most of the methanol present. The organic layer can then be separated, if water immiscible, or the resulting solution can be extracted with ether, methylene chloride, benzene, toluene, hexane, or the like, if water miscible. The combined extracts are then dried over a drying agent and the solvent removed by distillation followed by crystallization or chromatography giving the 4-alkyl derivative of the corresponding starting material. Illustrative of the compounds that can be prepared are 4-methyl-17β-hydroxy-4-androsten-3-one,
4-ethyl-17β-hydroxy-4-androsten-3-one,
4-propyl-17β-hydroxy-4-androsten-3-one,
4-isopropyl-17β-hydroxy-4-androsten-3-one,
4-butyl-17β-hydroxy-4-androsten-3-one,
4-isobutyl-17β-hydroxy-4-androsten-3-one,
4-tertiary butyl-17β-hydroxy-4-androsten-3-one,
4,17α-dimethyl-17β-hydroxy-4-androsten-3-one,
4-methyl-17α-ethyl-17β-hydroxy-4-androsten-3-one,
4-methyl-17α-vinyl-17β-hydroxy-4-androsten-3-one,
4-methyl-17α-(α-methallyl)-17β-hydroxy-4-androsten-3-one,
4-methyl-17α-ethinyl-17β-hydroxy-4-androsten-3-one,
4-methyl-17α-methylethinyl-17β-hydroxy-4-androsten-3-one,
4-ethyl-17α-methyl-17β-hydroxy-4-androsten-3-one,
4-propyl-17α-ethyl-17β-hydroxy-4-androsten-3-one,
4-isopropyl-17α-propyl-17β-hydroxy-4-androsten-3-one,
4-butyl-17α-vinyl-17β-hydroxy-4-androsten-3-one,
4-isobutyl-17α-(α-methallyl)-4-androsten-3-one,
4-tertiary butyl-17α-ethinyl-17β-hydroxy-4-androsten-3-one,
4-ethyl-17α-methylethinyl-4-androsten-3-one, and the like.

The thus obtained 4-alkyl-17β-hydroxy-4-androsten-3-ones and 4,17α-dialkyl-4-androsten-3-ones are hydrogenated, generally in solution in a solvent such as ethanol, methanol, or the like, using a noble metal catalyst, for example, palladium suspended on charcoal. Catalysts containing from two to ten parts of palladium per 100 parts of charcoal carrier are generally used. The hydrogen pressure is regulated between one and five atmospheres with hydrogen near atmospheric pressure preferred. The time of reaction is between five minutes to four hours whereafter the reaction mixture is filtered to remove the catalyst, the solution is evaporated to dryness and the residue is purified by recrystallization or chromatography, as deemed necessary, to obtain pure 4β-alkyl-17β-hydroxyandrostan-3-one and 4β,17α-dialkyl-17β-hydroxyandrostan-3-one, respectively.

Illustrative of the compounds that can be prepared are

4β-methyl-17β-hydroxyandrostan-3-one,
4β-ethyl-17β-hydroxyandrostan-3-one,
4β-propyl-17β-hydroxyandrostan-3-one,
4β-isopropyl-17β-hydroxyandrostan-3-one,
4β-butyl-17β-hydroxyandrostan-3-one,
4β-isobutyl-17β-hydroxyandrostan-3-one,
4β-tertiary butyl-17β-hydroxyandrostan-3-one,
4β,17α-dimethyl-17β-hydroxyandrostan-3-one,
4β-methyl-17α-ethyl-17β-hydroxyandrostan-3-one,
4β-methyl-17α-propyl-17β-hydroxyandrostan-3-one,
4β-methyl-17α-isopropyl-17β-hydroxyandrostan-3-one, 4β-methyl-17α-butyl-17β-hydroxyandrostan-3-one,
4β-methyl-17α-isobutyl-17β-hydroxyandrostan-3-one,
4β-methyl-17α-tertiary butyl-17β-hydroxyandrostan-3-one,
4β-methyl-17α-pentyl-17β-hydroxyandrostan-3-one,
4β-methyl-17α-hexyl-17β-hydroxyandrostan-3-one,
4β-ethyl-17α-methyl-17β-hydroxyandrostan-3-one,
4β-propyl-17α-ethyl-17β-hydroxyandrostan-3-one,
4β-isopropyl-17α-propyl-17β-hydroxyandrostan-3-one,
4β-butyl-17α-isopropyl-17β-hydroxyandrostan-3-one,
4β-isobutyl-17α-butyl-17β-hydroxyandrostan-3-one,
4β-tertiary butyl-17α-pentyl-17β-hydroxyandrostan-3-one, and the like.

In the same manner, the 17β-acylates of 4-alkyl-17β-hydroxy-4-androsten-3-one and the 17β-acylates of 4,17α-dialkyl-4-androsten-3-one are hydrogenated to produce the corresponding 4β-alkyl-17β-hydroxyandrostan-3-one 17β-acylate and 4β,17α-dialkyl-17β-hydroxyandrostan-3-one 17β-acylate.

The 4β-epimers, thus produced, are converted by epimerization to the corresponding 4α-alkyl-17β-hydroxyandrostan-3-one and the corresponding 4α,17α-dialkyl-17β-hydroxyandrostan-3-one. Conversion of the 4β-epimer can be accomplished by treatment at temperatures of zero degrees centigrade or slightly below in an organic solvent, such as chloroform, methylene chloride, ether, and the like, and in the presence of a prototropic agent (a proton-donating reagent) such as alcohols, organic acids, and the like with a hydrogen halide, for example gaseous hydrogen chloride or an ethanol solution of aqueous hydrogen chloride. The mixture should be maintained at temperatures below room temperature, preferably near zero degrees centigrade, during the addition of the acid. The reaction mixture can then be washed with successive portions of dilute alkali and water, and then dried and evaporated under reduced pressure. The 4α-alkyl products can be recovered from the reaction mixture and purified by recrystallization.

In the same manner, the 17β-acylates of 4β-alkyl-17β-hydroxyandrostan-3-one and the 17β-acylates of 4β,17α-dialkyl-17β-hydroxyandrostan-3-one are epimerized to give the corresponding 4α-epimers.

Alternatively, the epimerization can be accomplished with an alkali. Bases, such as for example, solutions of sodium hydroxide and potassium hydroxide can be used to epimerize the 4β-epimer in solution in an organic solvent, such as for example, methanol, thus producing the 4α-epimer.

The 17β-acylates of the 4-alkyl-17β-hydroxy-4-androsten-3-ones and 4-alkyl-17α-lower-aliphatic hydrocarbon-17β-hydroxy-4-androsten-3-ones and the 17β-acylates of the 4-alkyl-17β-hydroxyandrostan-3-ones, and 4,17α-dialkyl-17β-hydroxyandrostan-3-ones are obtainable by allowing the selected 4-alkyl-17β-hydroxy-4-androsten-3-one, 4-alkyl-17α-lower-aliphatic hydrocarbon-17β-hydroxy-4-androsten-3-one, 4-alkyl-17β-hydroxyandrostan-3-one or 4,17α-dialkyl-17β-hydroxyandrostan-3-one to react with the acid anhydride or acid halide of an organic carboxylic acid, particularly a hydrocarbon carboxylic acid, containing from one to twelve carbon atoms, inclusive, for example, a saturated straight-chain aliphatic acid, e.g., acetic, propionic, butyric, valeric, hexanoic, lauric, a saturated branched-chain aliphatic acid, e.g., trimethylacetic, isobutyric, isovaleric, a cycloaliphatic saturated acid, e.g., cyclohexane-carboxylic, β-phenylpropionic, an alkaryl acid, e.g., benzoic, phenylacetic, β-phenylpropionic, o-, m-, and p-toluic, a saturated dibasic acid (which can be converted into water-soluble, e.g., sodium, salts) e.g., succinic, adipic, a monobasic unsaturated acid, e.g., acrylic, crotonic, undecylenic, propiolic, cinnamic, a dibasic unsaturated acid (which can be converted into water-soluble, e.g., sodium, salts) e.g., maleic and citraconic.

The 4-alkyl-17α-lower-aliphatic hydrocarbon-17β-hydroxy-4-androsten-3-ones and 4,17α-dialkyl-17β-hydroxyandrostan-3-ones of this invention require vigorous esterification conditions, such as for example, heating with the appropriate acid anhydride at about 100 to 150 degrees centigrade to obtain the corresponding 17β-acylate, whereas the 4-alkyl-17β-hydroxy-4-androsten-3-ones and 4-alkyl-17β-hydroxyandrostan-3-ones of this invention are esterified under mild esterification conditions, such as for example, allowing the selected steroid in a pyridine solution to react with the appropriate acid anhydride at room temperature (25 degrees centigrade) for a period of from one to 36 hours to obtain the corresponding 17β-acylate.

The following examples and preparations are illustrative of the process and products of the present invention, but are not to be construed as limiting.

PREPARATION 1

A. 3-(N-Pyrrolidyl)-3,5-Androstadien-17-One

A solution of one gram of 4-androstene-3,17-dione in ten milliliters of methanol is warmed to near reflux temperature, then one milliliter of pyrrolidine is added and the mixture is warmed one minute, cooled, and scratched with a rod to induce crystallization. After chilling for one-half hour the precipitate of 3-(N-pyrrolidyl)-3,5-androstadien-17-one is collected by filtration, washed and dried.

B. 17β-Hydroxy-17α-(α-Methallyl)-4-Androsten-3-One

A solution of 0.100 mole of 2-butenylmagnesium bromide in thirty milliliters of diethyl ether is prepared according to the method of Young and Roberts, J. Am. Chem. Soc. 68, 1474 (1946), and is stirred under a nitrogen atmosphere while a solution of 3.73 grams of 3-(N-pyrrolidyl)-3,5-androstadien-17-one in fifty milliliters of tetrahydrofuran is added over a period of ten minutes. The mixture is distilled until the vapor temperature above the reaction mixture reaches 55 degrees centigrade and then heated at reflux for four hours. The mixture is poured carefully into iced ammonium chloride solution and the resulting mixture is extracted with ether. The ether extract is washed with water, dried over anhydrous sodium sulfate, and the solvent removed at room temperature or below under diminished pressure leaving a residue. The thus-obtained residue is heated at reflux for four hours in a buffered solution of six grams of sodium acetate, six milliliters of water, four milliliters of glacial acetic acid, and forty milliliters of methanol. This mixture is then diluted with water and extracted with ether. The ether extract is washed successively with water, dilute aqueous sodium carbonate, and water, dried over anhydrous sodium sulfate and evaporated to dryness, giving a crude product which is dissolved in methylene chloride and chromatographed over 100 grams of Florisil (synthetic magnesium silicate). The chromatogram column is eluted with Skellysolve B hexanes containing increasing proportions of acetone from one to fifty percent by volume. The eluted fractions are examined by infrared absorption analysis and those fractions which show no C–17 carbonyl absorption are combined and crystallized from acetone-hexane mixture to give 17β-hydroxy-17α-(α-methallyl)-4-androsten-3-one. In the manner shown in Preparation 1B, treating 3-(N-pyrrolidyl)-3,5-androstadien-17-one with allylmagnesium bromide and hydrolyzing the product in a buffered mixture is productive of 17α-allyl-17β-hydroxy-4-androsten-3-one. Similarly, 17α-(α-ethallyl)-17β-hydroxy-4-androsten-3-one, 17α-(α-propallyl)-17β-hydroxy-4-androsten-3-one, and 17α-(α-isopallyl)-17β-hydroxy-4-androsten-3-one are prepared by allowing 3-(N-pyrrolidyl)-3,5-androstadien-17-one to react with 2-pentenylmagnesium bromide, 2-hexenylmagnesium bromide or 2-isohexenylmagnesium bromide, respectively, and hydrolyzing the enamines as shown in Preparation 1B. Allylmagnesium bromide is obtained following procedure of Young and Roberts, J. Am. Chem. Soc 68, 1474 (1946) for the preparation of 2-butenylmagnesium bromide but substituting allyl bromide for 2-butenyl bromide. Similarly, 2-pentenylmagnesium bromide and 2-hexenylmagnesium bromide are prepared from 1-bromo-2-pentene and 1-bromo-2-hexene [Young, Richards and Azorlosa, J. Am. Chem. Soc. 61, 3070 (1939)], and 2-isohexenylmagnesium bromide is prepared from 1-bromo-4-methyl-2-pentene (isopropylallyl bromide) [Bouis, Annales de Chimie (10) 9, 412–421].

Similarly, 17β-hydroxy-17α-alkyl-4-androsten-3-ones can be prepared by substituting alkyl Grignard reagents containing from one to six carbon atoms, inclusive, such as for example, methylmagnesium bromide, ethylmagnesium bromide, propylmagnesium bromide, isopropylmagnesium bromide, tertiary butyl bromide, pentylmagnesium bromide, hexylmagnesium bromide, and the like for 2-butenylmagnesium bromide in Preparation 1B. Illustrative of the compounds thus prepared are 17α-methyl-17β-hydroxy-4-androsten-3-one,
17α-ethyl-17β-hydroxy-4-androsten-3-one,
17α-propyl-17β-hydroxy-4-androsten-3-one,
17α-isopropyl-17β-hydroxy-4-androsten-3-one,
17α-butyl-17β-hydroxy-4-androsten-3-one,
17α-tertiary butyl-17β-hydroxy-4-androsten-3-one,
17α-pentyl-17β-hydroxy-4-androsten-3-one,
17α-hexyl-17β-hydroxy-4-androsten-3-one, and the like.

EXAMPLE 1

*4-Methyl-17β-Hydroxy-4-Androsten-3-One*
*(4-Methyl-Testosterone)*

Twenty-five grams of testosterone was dissolved in 75 milliliters of boiling methanol and thereto was added ten milliliters of pyrrolidine. The yellow solution was kept in a nitrogen atmosphere for one minute on the steam bath, and then seeded. Flat, nearly what needles separated and the mixture solidified. An additional 25 milliliters of methanol was added and the mixture was chilled for one hour and then filtered. The product was washed with methanol and dried to given 29.95 grams of 3-(N-prrolidyl) - 17β-hydroxy - 3,5 - androstadiene (3-pyrrolidyl enamine of testosterone), of melting point 133 to 137 degrees centigrade and rotation $[\alpha]_D$ minus 116 degrees.

A suspension of ten grams of 3-(N-pyrrolidyl)-17β-hydroxy-3,5-androstadiene in 170 milliliters of methanol was refluxed for a period of sixteen hours with fifteen milliliters of methyl iodide. Thereafter fifty milliliters of water was added and the mixture was concentrated during one hour at atmospheric pressure then under reduced pressure. Addition of 150 milliliters of ether led to separation of N - (3,5-androstadien-17β-ol-3-yl) - N - methyl-pyrrolidinium iodide (testosterone pyrrolidyl enamine methiodide) as tan crystals, which were removed by filtration. The filtrate was separated into an aqueous and an ether portion and the aqueous portion thereof was extracted with 300-milliliter portions of ether. The ether extracts were combined with the ether portion of the filtrate, washed with ten percent sodium hydroxide, then 2.5 normal hydrochloric acid solution, water, and then dried over anhydrous sodium sulfate and Florisil synthetic magnesium silicate, filtered and the filtrate concentrated to a small volume. Addition of Skellysolve B hexanes gave 2.2 grams of dense crystals which were recrystallized from Skellysolve B and dilute methanol to give 4-methyl-17β-hydroxy-4-androsten-3-one of melting point 158 to 163 degrees centigrade, and having an ultraviolet absorption of $\lambda$max.249.5 m$\mu$ ($a_M$ 14,300).

Similarly, substituting other alkyl halides containing from one to four carbon atoms, inclusive, in place of methyl iodide, such as for example, ethyl bromide, propyl chloride, isopropyl iodide, butyl chloride, isobutyl bromide, tertiary butyl iodide, and the like, the above procedure of Example 1 is productive of the other 4-alkyl-17β-hydroxy-4-androsten-3-ones, such as for example, 4-ethyl-17β-hydroxy-4-androsten-3-one, 4-propyl-17β-hydroxy-4-androsten-3-one, 4-isopropyl-17β-hydroxy-4-androsten-3-one, 4-butyl-17β-hydroxy-4-androsten-3-one, 4-isobutyl-17β-hydroxy-4-androsten-3-one, and 4-tertiary butyl-4-androsten-3-one.

EXAMPLE 2

*4β-Methyl-17β-Hydroxyandrostan-3-One*

A solution of 250 milligrams of 4-methyltestosterone in 25 milliliters of absolute ethanol was hydrogenated at atmospheric pressure using 100 milligrams of five percent palladium catalyst on a charcoal carrier. After six minutes, consumption of hydrogen had almost ceased. After one hour hydrogenation was ended and the catalyst was removed by filtration, the filtrate was evaporated to a glassy residue and chromatographed over ten grams of Florisil synthetic magnesium silicate using fractions of 100 milliliters each for elution as follows in Table I:

TABLE I

| Fraction | Solvent |
| --- | --- |
| 1–4 | Acetone: petroleum ether 2:98. |
| 5–15 | Acetone: petroleum ether 5:195. |
| 16–17 | Acetone: petroleum ether 4:96. |
| 18–19 | Acetone: petroleum ether 5:95. |
| 20 | Acetone: petroleum ether 7:93. |
| 21–22 | Acetone: petroleum ether 8:92. |
| 23–29 | Acetone: petroleum ether 10:90. |

Fractions 6 and 7 (64 milligrams) were combined and recrystallized from ether-Skellysolve B hexanes to give 44.2 milligrams of 4β-methyl-17β-hydroxyandrostan-3-one of melting point 193 to 197 degrees centigrade and rotation $[\alpha]_D$ plus seven degrees (chloroform).

*Anal.*—Calculated for $C_{20}H_{32}O_2$: C, 78.88; H, 10.59. Found: C, 79.15; H, 10.34.

Similarly, substituting other 4-alkyltestosterones, such as for example, 4-ethyltestosterone, 4-propyltestosterone, 4-isopropyltestosterone, 4-butyltestosterone, 4-isobutyltestosterone, 4-tertiary butyl testosterone, and the like in place of 4-methyltestosterone in Example 2 is productive of 4β-ethyl-17β-hydroxyandrostan-3-one, 4β-propyl-17β-hydroxyandrostan-3-one, 4β-isopropyl-17β-hydroxyandrostan-3-one, 4β-butyl-17β-hydroxyandrostan-3-one, 4β-isobutyl-17β-hydroxyandrostan-3-one, 4β-tertiary butyl-17β-hydroxyandrostan-3-one, and the like.

EXAMPLE 3

*4α-Methyl-17β-Hydroxyandrostan-3-One*

A solution of 1.63 grams of 4β-methyl-17β-hydroxyandrostan-3-one and 1.65 milliliters of absolute ethanol in 165 milliliters of chloroform was maintained at minus five to minus ten degrees centigrade for one-half hour while hydrogen chloride gas was bubbled through the solution. The reaction mixture was then poured into 300 milliliters of ice and saturated aqueous sodium bicarbonate. The organic layer was separated, washed with aqueous sodium bicarbonate, then with water, and was dried over anhydrous sodium sulfate. The thus-obtained solution was chromatographed over 140 grams of Florisil synthetic magnesium silicate. Elution with acetone in Skellysolve B hexanes and recrystallization from acetone-Skellysolve B hexanes gave 4α-methyl-17β-hydroxyandrostan-3-one.

Similarly, substituting other 4β-alkyl-17β-hydroxyandrostan-3-ones in place of 4β-methyl-17β-hydroxyandrostan-3-one in Example 3 is productive of the corresponding 4α-alkyl-17β-hydroxyandrostan-3-one, such as for example, 4α-ethyl-17β-hydroxyandrostan-3-one, 4α-propyl-17β-hydroxyandrostan-3-one, 4α - isopropyl-17β-hydroxyandrostan - 3 - one, 4α-butyl-17β-hydroxyandrostan-3-one, 4α-isobutyl-17β-hydroxyandrostan-3-one, and 4α-tertiary butyl-17β-hydroxyandrostan-3-one.

Example 4

4-Methyl-17β-Hydroxy-4-Androsten-3-One 17β-Propionate (4-Methyltestosterone 17β-Propionate)

A solution containing two grams of 4-methyl-17β-hydroxy-4-androsten-3-one in twenty milliliters of pyridine and twenty milliliters of propionic anhydride was allowed to stand at room temperature (about 25 degrees centigrade) for sixteen hours. The reaction mixture was then poured into 200 milliliters of ice water and the resulting solid material was isolated by filtration and recrystallized from Skellysolve B hexane-acetone to give 4-methyl-17β-hydroxy-4-androsten-3-one 17β-propionate, a light colored crystalline solid.

Example 5

4β-Methyl-17β-Hydroxyandrostan-3-One 17β-Propionate and 4α-Methyl-17β-Hydroxyandrostan-3-One 17β-Propionate Following the procedure of Example 4 and substituting 4β-methyl-17β-hydroxyandrostan-3-one and 4α-methyl-17β-hydroxyandrostan-3-one as starting material therein is productive of 4β-methyl-17β-hydroxyandrostan-3-one 17β-propionate and 4α-methyl-17β-hydroxyandrostan-3-one 17β-propionate, respectively.

Similarly, by following the acylation procedures described in Examples 4 and 5 above, still other 17β-acylates are prepared by reacting the selected 4-alkyl-17β-hydroxy-4-androsten-3-one, 4β-alkyl-17β-hydroxyandrostan-3-one or 4α-alkyl-17β-hydroxyandrostan-3-one with the appropriate hydrocarbon carboxylic acid anhydride. Illustrative of the esters thus produced are 4-methyl-17β-hydroxy-4-androsten-3-one 17β-acetate,
4-methyl-17β-hydroxy-4-androsten-3-one 17β-butyrate,
4-methyl-17β-hydroxy-4-androsten-3-one 17β-valerate,
4-methyl-17β-hydroxy-4-androsten-3-one 17β-hexanoate,
4-methyl-17β-hydroxy-4-androsten-3-one 17β-trimethylacetate,
4-methyl-17β-hydroxy-4-androsten-3-one 17β-isovalerate,
4-methyl-17β-hydroxy-4-androsten-3-one 17β-cyclohexane-carboxylate,
4-methyl-17β-hydroxy-4-androsten-3-one 17β-benzoate,
4-methyl-17β-hydroxy-4-androsten-3-one 17β-(β-phenylpropionate),
4-methyl-17β-hydroxy-4-androsten-3-one 17β-hemisuccinate,
4-methyl-17β-hydroxy-4-androsten-3-one 17β-acrylate,
4-methyl-17β-hydroxy-4-androsten-3-one 17β-undecylenate,
4-methyl-17β-hydroxy-4-androsten-3-one 17β-cinnamate,
4-methyl-17β-hydroxy-4-androsten-3-one 17β-maleate,
4-methyl-17β-hydroxy-4-androsten-3-one 17β-trifluoroacetate,
4β-methyl-17β-hydroxyandrostan-3-one 17β-acetate,
4β-methyl-17β-hydroxyandrostan-3-one 17β-butyrate,
4β-methyl-17β-hydroxyandrostan-3-one 17β-valerate,
4β-methyl-17β-hydroxyandrostan-3-one 17β-laurate,
4β-methyl-17β-hydroxyandrostan-3-one 17β-isobutyrate,
4β-methyl-17β-hydroxyandrostan-3-one 17β-cyclohexanecarboxylate,
4β-methyl-17β-hydroxyandrostan-3-one 17β-phenylacetate,
4β-methyl-17β-hydroxyandrostan-3-one 17β-o-, m-, p-toluate,
4β-methyl-17β-hydroxyandrostan-3-one 17β-hemiadipate,
4β-methyl-17β-hydroxyandrostan-3-one 17β-crotonate,
4β-methyl-17β-hydroxyandrostan-3-one 17β-propiolate,
4β-methyl-17β-hydroxyandrostan-3-one 17β-citraconate,
4β-methyl-17β-hydroxyandrostan-3-one 17β-chloroacetate,
4α-methyl-17β-hydroxyandrostan-3-one 17β-acetate,
4α-methyl-17β-hydroxyandrostan-3-one 17β-butyrate,
4α-methyl-17β-hydroxyandrostan-3-one 17β-valerate,
4α-methyl-17β-hydroxyandrostan-3-one 17β-hexanoate,
4α-methyl-17β-hydroxyandrostan-3-one 17β-isovalerate,
4α-methyl-17β-hydroxyandrostan-3-one 17β-β-phenylpropionate,
4α-methyl-17β-hydroxyandrostan-3-one 17β-hemiadipate,
4α-methyl-17β-hydroxyandrostan-3-one 17β-undecylenate,
4α-methyl-17β-hydroxyandrostan-3-one 17β-propiolate,
4α-methyl-17β-hydroxyandrostan-3-one 17β-maleate, the corresponding 4-ethyl, 4-propyl, 4-isopropyl, 4-butyl, 4-isobutyl, 4-tertiary butyl compounds, and the like.

Example 6

4,17α-Dimethyl-17β-Hydroxy-4-Androsten-3-One (4,17α-Dimethyltestosterone)

A solution containing twenty grams of 17α-methyl-17β-hydroxy-4-androsten-3-one (methyltestosterone) in forty milliliters of methanol and eight milliliters of pyrrolidine was kept under a nitrogen atmosphere and warmed for one minute at fifty to sixty degrees centrigrade. On cooling, crystals separated from solution and were removed by filtration, washed with methanol and dried giving 23 grams of 3-pyrrolidyl enamine of 17α-methyl-17β-hydroxy-4-androsten-3-one having a rotation of $[\alpha]_D$ minus 27 degrees in pyridine, and a rotation of $[\alpha]_D$ minus 27 degrees in chloroform.

A suspension containing twenty grams of the 3-pyrrolidyl enamine of 17α-methyl-17β-hydroxy-4-androsten-3-one in 345 milliliters of methanol and forty milliliters of methyl iodide was refluxed for 135 minutes, diluted with sixty milliliters of water and allowed to stand overnight at about 25 degrees centrigrade. The mixture was refluxed for one hour and then concentrated by distillation. The residue was extracted with four 100-milliliters portions of ether. The ether extracts were combined and washed successively with water, five percent aqueous sodium hydroxide solution, 2.5 normal hydrochloric acid, ten percent aqueous sodium hydroxide solution, and water. The combined ether extracts were then dried over sodium sulfate and concentrated by distillation giving 4.5 grams of crude crystals of 4,17α-dimethyl-17β-hydroxy-4-androsten-3-one melting at 136 to 143 degrees centigrade. The crude product was recrystallized from dilute methanol giving 4,17α-dimethyl-17β-hydroxy-4-androsten-3-one with an ultraviolet absorption $$\lambda_{max}^{alc.} \ 247.5 \ m\mu, \ a_M \ 16,000$$

paper chromatographic analysis showed the material to be sixty percent 4,17α-dimethyl-17β-hydroxy-4-androsten-3-one and forty percent starting material. The crude product was then chromatographed on synthetic magnesium silicate and eluted with increasing proportions of acetone in Skellysolve B hexanes, the fractions exhibiting an ultraviolet absorption $$\lambda_{max}^{alc.} \ 250 \ to \ 251 \ m\mu$$

inclusive, were recrystallized from methanol giving substantially pure 4,17α-dimethyl-17β-hydroxy-4-androsten-3-one. The ultraviolet absorption was $$\lambda_{max}^{alc.} \ 251 \ m\mu$$

Substituting as starting material other 17α-lower-aliphatic hydrocarbon-17β-hydroxy-4-androsten-3-one, such as for example, 17α-methyl-17β-hydroxy-4-androsten-3-one, 17α-ethyl-17β-hydroxy-4-androsten-3-one, 17α-vinyl-17β-hydroxy-4-androsten-3-one, 17α-(α-methallyl)-17β-hydroxy-4-androsten-3-one, 17α-ethinyl-17β-hydroxy-4-androsten-3-one, 17α-methylethinyl-17β-hydroxy-4-androsten-3-one, and the like and using methyliodide or other alkyl halides containing from one to four carbon atoms, inclusive, in place thereof, such as for example, ethyl bromide, propyl chloride, isopropyl iodide, isobutyl bromide, tertiary butyl iodide, and the like, Example 1 is productive of the other 4-alkyl-17α-lower-aliphatic hydrocarbon-4-androsten-3-ones, such as for example, 4-methyl-17α-ethyl-17β-hydroxy-4-androsten-3-one, 4-methyl-17α-vinyl-17β-hydroxy-4-androsten-3-one, 4-methyl-17α-(α-methallyl)-17β-hydroxy-4-androsten-3-one, 4- methyl-17α-ethinyl-17β-hydroxy-4-androsten-3-one, 4-methyl-17α-methylethinyl-17β-hydroxy-4-androsten-3-one, the corresponding 4-ethyl, 4-propyl, 4-isopropyl, 4-butyl, 4-isobutyl, 4-tertiary butyl compounds and the like.

EXAMPLE 7

*4β,17α-Dimethyl-17β-Hydroxyandrostan-3-One*

A solution of 300 milligrams of 4,17α-dimethyl-17β-hydroxy-4-androsten-3-one in thirty milliliters of absolute ethanol was hydrogenated at atmospheric pressure using 125 milligrams of five percent palladium catalyst on a charcoal carrier. After ten minutes consumption of hydrogen had almost ceased. After one hour hydrogenation was ended and the catalyst was removed by filtration and the solvent evaporated. The residue was chromatographed over twelve grams of Florisil synthetic magnesium silicate and eluted with acetone-petroleum ether. The crude product thus obtained was recrystallized from ether-Skellysolve B hexanes to give 4β,17α-dimethyl-17β-hydroxyandrostan-3-one.

Substituting as starting material other 4,17α-dialkyl-17β-hydroxy-4-androsten-3-ones, for example, 4-methyl-17α-ethyl-17β-hydroxy-4-androsten-3-one,
4-methyl-17α-propyl-17β-hydroxy-4-androsten-3-one,
4-methyl-17α-isopropyl-17β-hydroxy-4-androsten-3-one,
4-methyl-17α-butyl-17β-hydroxy-4-androsten-3-one,
4-methyl-17α-isobutyl-17β-hydroxy-4-androsten-3-one,
4-methyl-17α-tertiary butyl-17β-hydroxy-4-androsten-3-one,
4-methyl-17α-pentyl-17β-hydroxy-4-androsten-3-one,
4-methyl-17α-hexyl-17β-hydroxy-4-androsten-3-one, or the corresponding 4-ethyl, 4-propyl, 4-isopropyl, 4-butyl, 4-isobutyl, 4-tertiary butyl compounds and the like, the above procedure of Example 6 is productive of other 4β,17α-dialkyl-17β-hydroxyandrostan-3-ones, for example, 4β-methyl-17α-ethyl-17β-hydroxyandrostan-3-one,
4β-methyl-17α-propyl-17β-hydroxyandrostan-3-one,
4β-methyl-17α-isopropyl-17β-hydroxyandrostan-3-one,
4β-methyl-17α-butyl-17β-hydroxyandrostan-3-one,
4β-methyl-17α-isobutyl-17β-hydroxyandrostan-3-one,
4β-methyl-17α-tertiary butyl-17β-hydroxyandrostan-3-one,
4β-methyl-17α-pentyl-17β-hydroxyandrostan-3-one,
4β-methyl-17α-hexyl-17β-hydroxyandrostan-3-one, the corresponding 4β-ethyl, 4β-propyl, 4β-isopropyl, 4β-butyl, 4β-tertiary butyl compounds, and the like.

EXAMPLE 8

*4α,17α-Dimethyl-17β-Hydroxyandrostan-3-One*

Following the procedure of Example 3, above, and substituting as starting material 4β,17α-dimethyl-17β-hydroxyandrostan-3-one in place of 4β-methyl-17β-hydroxyandrostan-3-one, the process is productive of 4α,17α-dimethyl-17β-hydroxyandrostan-3-one, a light colored crystalline solid.

Similarly, substituting the selected 4β,17α-dialkyl-17β-hydroxyandrostan-3-one, such as for example, those prepared in Example 7, above, in place of 4β,17α-dimethyl-17β-hydroxyandrostan-3-one, Example 8 is productive of the corresponding 4α,17α-dialkyl-17β-hydroxyandrostan-3-one.

EXAMPLE 9

*4,17α-Dimethyl-17β-Hydroxy-4-Androsten-3-One 17β-Propionate*

A solution containing one gram of 4,17α-dimethyl-17β-hydroxy-4-androsten-3-one in nine milliliters of propionic anhydride was heated under reflux for thirty minutes. The excess propionic anhydride was then removed by evaporation and the residue crystallized from aqueous methanol to give 4,17α-dimethyl-17β-hydroxy-4-androsten-3-one 17β-propionate.

Substituting as starting material other 4-alkyl-17α-lower-aliphatic hydrocarbon-17β-hydroxy-4-androsten-3-ones represented by Formula III, such as for example, 4-methyl-17α-ethyl-17β-hydroxy-4-androsten-3-one,
4-methyl-17α-vinyl-17β-hydroxy-4-androsten-3-one,
4-methyl-17α-(α-methallyl)-17β-hydroxy-4-androsten-3-one,
4-methyl-17α-ethinyl-17β-hydroxy-4-androsten-3-one,
4-methyl-17α-methylethinyl-17β-hydroxy-4-androsten-3-one or the corresponding 4-ethyl, 4-propyl, 4-isopropyl, 4-butyl, 4-isobutyl, 4-tertiary butyl compounds, and the like in the above procedure is productive of other 4-alkyl-17α-lower-aliphatic hydrocarbon-4-androsten-3-one-17β-propionates, such as for example, 4-methyl-17α-ethyl-17β-hydroxy-4-androsten-3-one 17β-propionate,
4-methyl-17α-vinyl-17β-hydroxy-4-androsten-3-one 17β-propionate,
4-methyl-17α-(α-methallyl)-17β-hydroxy-4-androsten-3-one 17β-propionate,
4-methyl-17α-ethinyl-4-androsten-3-one 17β-propionate,
4-methyl-17α-methylethinyl-4-androsten-3-one 17β-propionate, the corresponding 4-ethyl, 4-propyl, 4-isopropyl, 4-isobutyl, 4-tertiary butyl compounds, and the like.

Similarly, by following the acylation procedures described in Example 9 above, still other 17β-acylates are prepared by reacting the selected 4-alkyl-17α-lower-aliphatic hydrocarbon-17β-hydroxy-4-androsten-3-one with the appropriate hydrocarbon carboxylic acid anhydride or acid halide. Illustrative of the esters thus produced are 4,17α-dimethyl-17β-hydroxy-4-androsten-3-one 17β-acetate,
4-methyl-17α-ethyl-17β-hydroxy-4-androsten-3-one 17β-butyrate,
4-methyl-17α-propyl-17β-hydroxy-4-androsten-3-one 17β-hexanoate,
4-methyl-17α-isopropyl-17β-hydroxy-4-androsten-3-one 17β-laurate,
4-methyl-17α-butyl-17β-hydroxy-4-androsten-3-one 17β-isobutyrate,
4-methyl-17α-isobutyl-17β-hydroxy-4-androsten-3-one 17β-isovalerate,
4-methyl-17α-tertiary butyl-17β-hydroxy-4-androsten-3-one 17β-cyclohexane-carboxylate,
4-methyl-17α-pentyl-17β-hydroxy-4-androsten-3-one 17β-phenylacetate,
4-methyl-17α-hexyl-17β-hydroxy-4-androsten-3-one 17β-(β-phenylpropionate),
4,17α-dimethyl-17β-hydroxy-4-androsten-3-one 17β-hemiadipate,
4-methyl-17α-ethyl-17β-hydroxy-4-androsten-3-one 17β-hemisuccinate,
4-methyl-17α-propyl-17β-hydroxy-4-androsten-3-one 17β-crotonate,
4-methyl-17α-isopropyl-17β-hydroxy-4-androsten-3-one 17β-propiolate
4-methyl-17α-butyl-17β-hydroxy-4-androsten-3-one 17β-cinnamate,
4-methyl-17α-isobutyl-17β-hydroxy-4-androsten-3-one 17β-maleate,
4-methyl-17α-tertiary butyl-17β-hydroxy-4-androsten-3-one 17β-citraconate,
4-methyl-17α-pentyl-17β-hydroxy-4-androsten-3-one 17β-propionate,
4-methyl-17α-hexyl-17β-hydroxy-4-androsten-3-one 17β-acetate,
4-methyl-17α-vinyl-17β-hydroxy-4-androsten-3-one 17β-acetate,
4-methyl-17α-(α-methallyl)-17β-hydroxy-4-androsten-3-one 17β-acetate, 4-methyl-17α-ethinyl-17β-hydroxy-4-androsten-3-one 17β-acetate,
4-methyl-17α-methylethinyl-17β-hydroxy-4-androsten-3-one 17β-acetate,
4-methyl-17α-vinyl-17β-hydroxy-4-androsten-3-one, 17β-valerate,
4-methyl-17α-(α-methallyl)-17β-hydroxy-4-androsten-3-one 17β-hexanoate
4-methyl-17α-ethinyl-17β-hydroxy-4-androsten-3-one 17β-laurate,
4-methyl-17α-methylethinyl-17β-hydroxy-4-androsten-3-one 17β-trimethylacetate,
4-methyl-17α-vinyl-17β-hydroxy-4-androsten-3-one 17β-cyclohexane-carboxylate,
4-methyl-17α-vinyl-17β-hydroxy-4-androsten-3-one 17β-benzoate,
4-methyl-17α-(α-methallyl)-17β-hydroxy-4-androsten-3-one 17β-(β-phenylpropionate),
4-methyl-17α-ethinyl-17β-hydroxy-4-androsten-3-one 17β-hemisuccinate,
4-methyl-17α-methylethinyl-17β-hydroxy-4-androsten-3-one 17β-acrylate,
4-methyl-17α-vinyl-17β-hydroxy-4-androsten-3-one 17β-undecylenate,
4-methyl-17α-(α-ethallyl)-17β-hydroxy-4-androsten-3-one 17β-propiolate,
4-methyl-17α-vinyl-17β-hydroxy-4-androsten-3-one 17β-cinnamate,
4-methyl-17α-(α-methallyl)-17β-hydroxy-4-androsten-3-one 17β-maleate, the corresponding 4-ethyl, 4-propyl, 4-isopropyl, 4-isobutyl, 4-tertiary butyl compounds and the like.

EXAMPLE 10

*4β,17α-Dimethyl-17β-Hydroxyandrostan-3-One 17β-Propionate*

Following the procedure of Example 7 and substituting 4,17α-dimethyl-17β-hydroxy-4-androsten-3-one 17β-propionate for 4,17α-dimethyl-17β-hydroxy-4-androsten-3-one, the procedure is productive of 4β,17α-dimethyl-17β-hydroxy-androsten-3-one 17β-propionate.

Similarly, substituting other 4,17α-dialkyl-17β-hydroxy-4-androsten-3-one 17β-acylates, such as for example, those prepared in Example 9, above, for 4,17α-dimethyl-17β-hydroxyandrosten-3-one, Example 7 is productive of the corresponding 4β,17α-dialkyl-17β-hydroxy-4-androstan-3-one 17β-acylate. Illustrative of the compounds thus prepared are 4β,17α-dimethyl-17β-hydroxyandrostan-3-one 17β-acetate,
4β-methyl-17α-ethyl-17β-hydroxyandrostan-3-one 17β-butyrate,
4β-methyl-17α-propyl-17β-hydroxyandrostan-3-one 17β-hexanoate,
4β-methyl-17α-isopropyl-17β-hydroxyandrostan-3-one 17β-laurate,
4β-methyl-17α-butyl-17β-hydroxyandrostan-3-one 17β-isobutyrate,
4β-methyl-17α-isobutyl-17β-hydroxyandrostan-3-one 17β-isovalerate,
4β-methyl-17α-tertiary butyl-17β-hydroxyandrostan-3-one 17β-cyclohexane-carboxylate,
4β-methyl-17α-pentyl-17β-hydroxyandrostan-3-one 17β-phenylacetate,
4β-methyl-17α-hexyl-17β-hydroxyandrostan-3-one 17β-(β-phenylpropionate),
4β,17α-dimethyl-17β-hydroxyandrostan-3-one 17β-hemiadipate,
4β-methyl-17α-ethyl-17β-hydroxyandrostan-3-one-17β-hemisuccinate,
4β-methyl-17α-propyl-17β-hydroxyandrostan-3-one 17β-propionate,
4β-methyl-17α-butyl-17β-hydroxyandrostan-3-one 17β-acetate, the corresponding 4β-ethyl, 4β-propyl, 4β-isopropyl, 4β-butyl, 4β-isobutyl, 4β-tertiary butyl compounds, and the like.

EXAMPLE 11

*4α,17α-Dimethyl-17β-Hydroxyandrostan-3-One 17β-Propionate*

Following the procedure of Example 3, and substituting 4β,17α-dimethyl-17β-hydroxyandrostan-3-one 17β-propionate for 4β-methyl-17β-hydroxyandrostan-3-one, the process is productive of 4α,17α-dimethyl-17β-hydroxyandrostan-3-one 17β-propionate.

Similarly, substituting other 4β,17α-dialkyl-17β-androstan-3-one 17β-acylates, such as for example, those prepared in Example 10, above, for 4β-methyl-17β-hydroxyandrostan-3-one, Example 3 is productive of the corresponding 4α-epimer of the selected 4β,17α-dialkyl-17β-hydroxyandrostan-3-one 17β-acylate.

It is to be understood that the invention is not to be limited to the exact details of operation or exact compounds, shown and described, as obvious modifications and equivalents will be apparent to one skilled in the art, and the invention is therefore to be limited only by the scope of the appended claims.

We claim:
1. A 4-alkyl-4-androstene of the following formula:

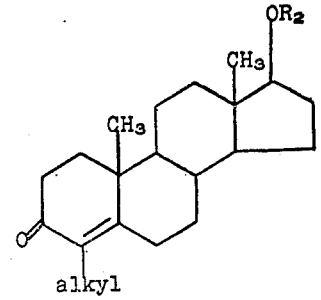

wherein $R_2$ is selected from the group consisting of hydrogen and the acyl radical of a hydrocarbon carboxylic acid containing from one to twelve carbon atoms, inclusive, and wherein "alkyl" is a lower-alkyl radical containing from one to four carbon atoms, inclusive.

2. 4-alkyl-17β-hydroxy-4-androsten-3-one-17β-acylates, wherein the alkyl radical contains from one to four carbon atoms, inclusive, and wherein the acyl radical is that of a hydrocarbon carboxylic acid containing from one to twelve carbon atoms, inclusive.

3. 4-methyl-17β-hydroxy-4-androsten-3-one 17β-propionate.

4. 4-methyl-17α-vinyl-17β-hydroxy-4-androsten-3-one.

5. 4-methyl-17α-(α-methallyl)-17β-hydroxy-4-androsten-3-one.

6. 4-methyl-17α-ethinyl-17β-hydroxy-4-androsten-3-one.

7. 4-methyl-17α-methylethinyl-17β-hydroxy-4-androsten-3-one.

8. 4-lower alkyl-Δ⁴-androsten-17β-ol-3-one.

9. 4-methyl-Δ⁴-androsten-17β-ol-3-one.

References Cited in the file of this patent

UNITED STATES PATENTS

| | | |
|---|---|---|
| 2,844,602 | Ringold et al. | July 22, 1958 |
| 2,845,381 | Tindall | July 29, 1958 |

OTHER REFERENCES

Rodd: Chemistry of Carbon Compounds, volume II, part B, Alicyclic compounds, 1553, pages 915, 918, 921.